J. E. LAMB.
ROTARY PLOW.
APPLICATION FILED JULY 8, 1912.

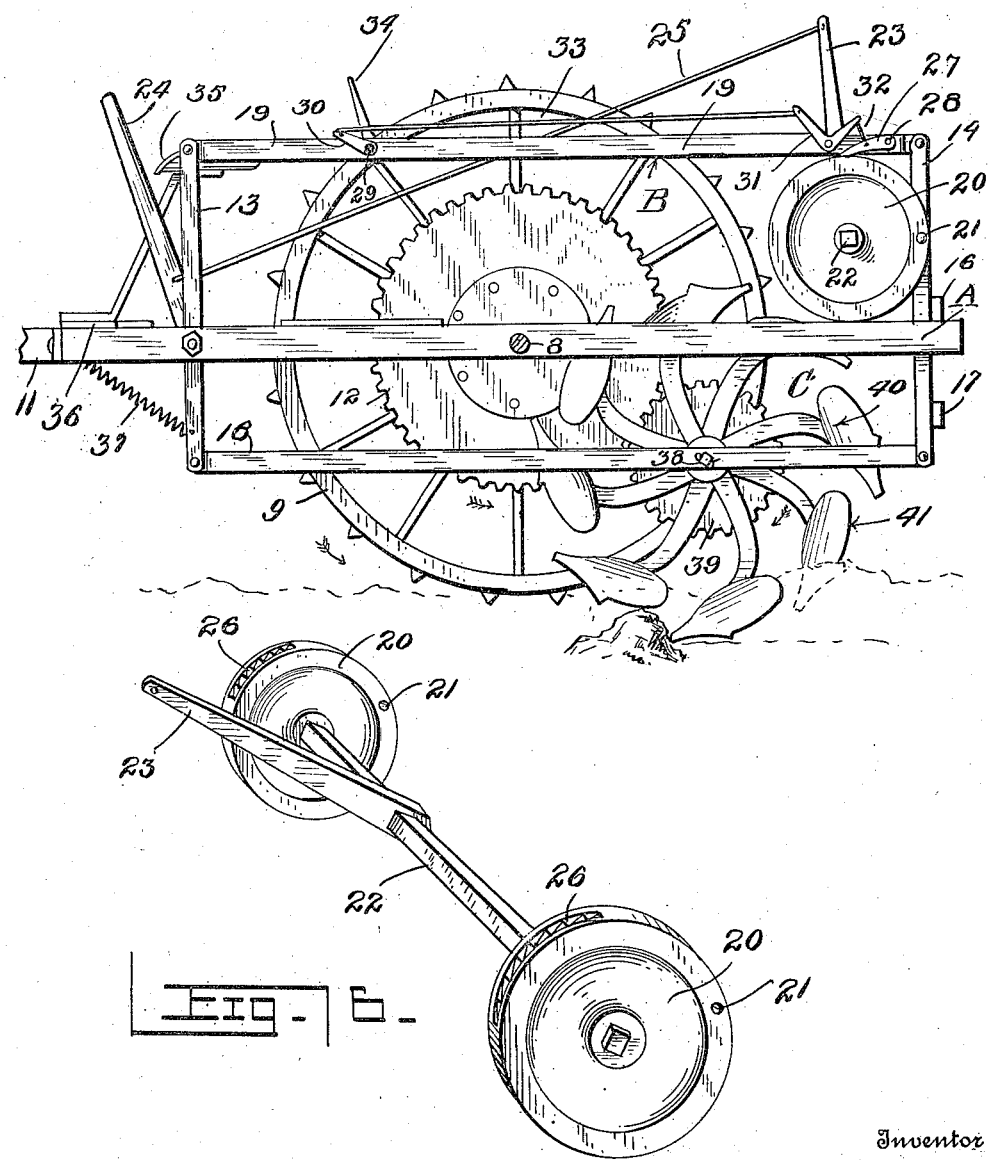

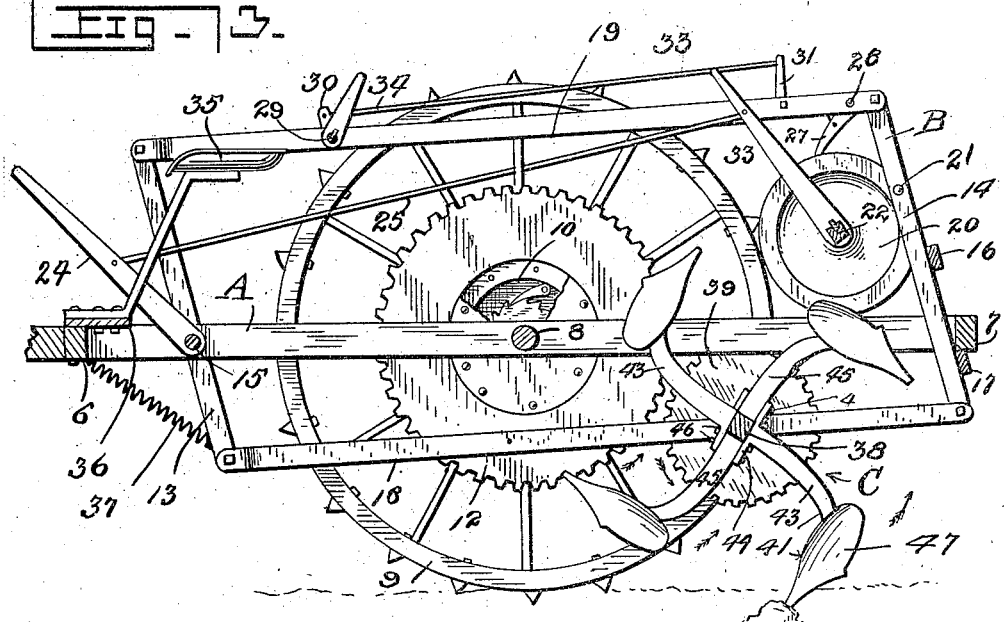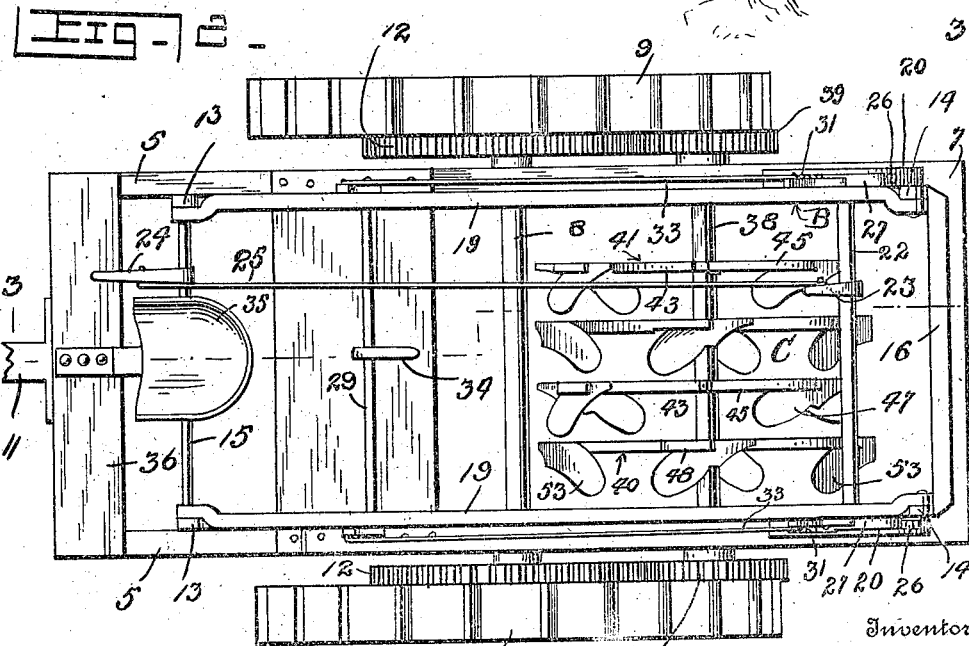

1,054,571.

Patented Feb. 25, 1913.
3 SHEETS—SHEET 3.

Witnesses

Inventor
J. E. Lamb
By
Attorney

UNITED STATES PATENT OFFICE.

JOSEPH EDWIN LAMB, OF UNION CHURCH, MISSISSIPPI.

ROTARY PLOW.

1,054,571.  Specification of Letters Patent.  Patented Feb. 25, 1913.

Application filed July 8, 1912. Serial No. 708,343.

*To all whom it may concern:*

Be it known that I, JOSEPH E. LAMB, a citizen of the United States, residing at Union Church, in the county of Jefferson, State of Mississippi, have invented certain new and useful Improvements in Rotary Plows; and I do hereby declare the following to be a full, clear, and exact description of the invention, such as will enable others skilled in the art to which it appertains to make and use the same.

This invention relates to improvements in agricultural implements of the rotary plow type.

The principal object of the invention is to provide an implement of the character described in which the plow is normally held in operative engagement with a driving mechanism, and which is automatically disengaged from said driving mechanism and elevated above the ground upon the plow striking an obstruction, such as a stone or the like, thereby avoiding any danger of the plow becoming broken.

Another object of the invention is to provide an implement of the character described which is provided with means for automatically retaining the plow in its elevated position.

A further object of the invention is to provide a novel means for manually raising and automatically locking the plow out of engagement with the driving mechanism and above the ground, whereby the implement may be readily transported from place to place.

A still further object of the invention is to provide a novel mechanism for manually releasing the locking means, so as to permit of the plow to quickly return to its normal position in engagement with the driving mechanism.

A still further object of the invention is to provide an implement of the character described which is composed of a relatively few number of parts, is therefore simple in construction, and is cheap to manufacture.

With these and other objects in view, the invention consists in the construction and novel combination of parts hereinafter fully described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

Figure 4:
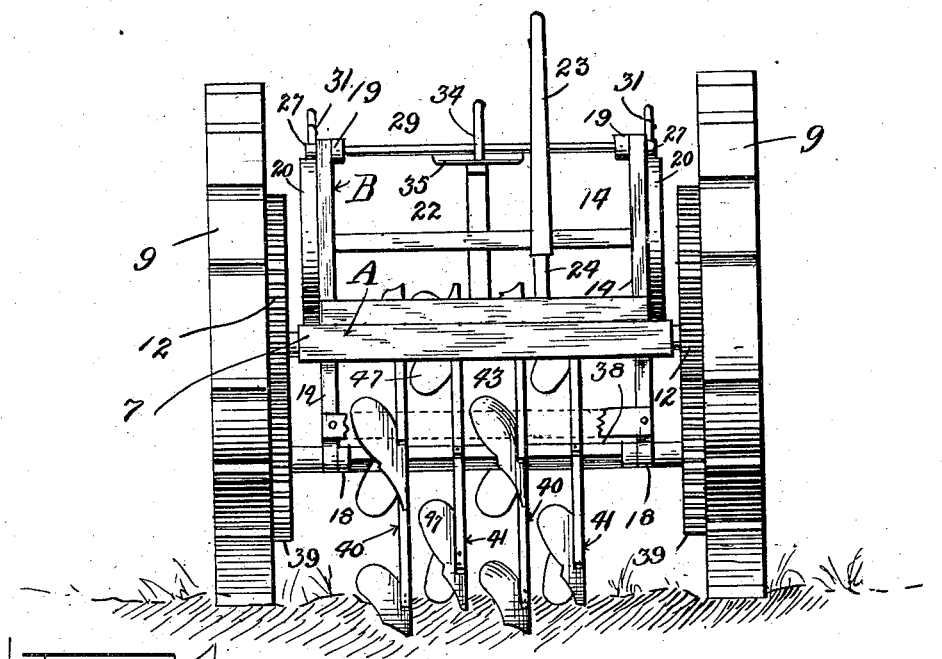
Figure 5:
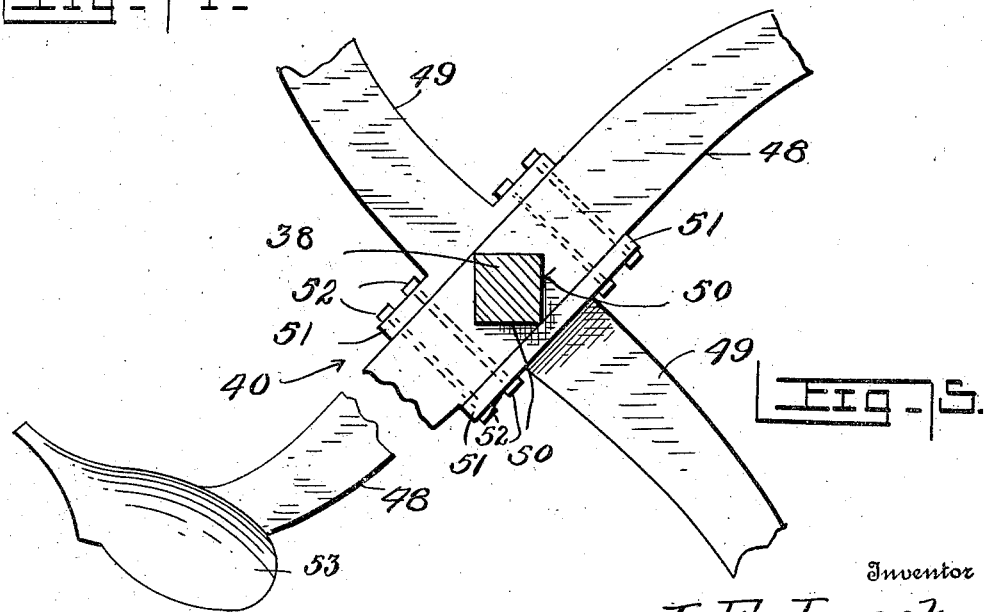

In the drawings: Figure 1 is a side elevation of an implement constructed in accordance with my invention, the plow being shown in its normal position, Fig. 2 is a top plan view thereof, Fig. 3 is a longitudinal sectional view taken on the line 3—3 of Fig. 2, the plow being shown in its elevated position, Fig. 4 is an end elevation of the structure shown in Fig. 1, Fig. 5 is a detail sectional view showing one of the means employed for connecting a set of plows, and Fig. 6 is a perspective view of the hand lever showing the eccentrics attached thereto.

Like reference numerals designate corresponding parts in all the figures of the drawings.

Referring to the drawings, A designates the main frame of the implement, and this frame includes the usual side sills 5—5, front end sill 6 and rear end sill 7. A transversely disposed axle 8 is journaled centrally in the side sills 5 of the main frame, and mounted upon the ends of the axle are tractor wheels 9—9 of any suitable construction, said wheels being connected to the axles by means of ratchets of ordinary construction, one of said ratchets only being shown, and designated as a whole by the reference numeral 10. By means of these ratchets the implement may be easily turned around corners, as will be readily understood. Extending forwardly from the front end member 6 is a draft pole 11. Carried by the inner face of each tractor wheel 9 is a drive gear 12.

My invention further comprises a supplemental frame, which is designated as a whole by the reference letter B. This frame includes an opposed pair of front uprights 13—13 and an opposed pair of rear uprights 14—14, the front uprights being each pivoted intermediate its ends upon a transverse shaft 15 which is supported at its ends by the side sills 5 of the main frame, and the rear uprights 14 are connected by spaced transverse upper and lower members 16 and 17. The lower ends of each respective pair of uprights 13 and 14 are pivotally connected by a link rod 18, and the upper ends of each respective pair of said uprights are pivotally connected by a link rod 19.

In order to support the rear end of the supplemental frame B upon the main frame A, there is provided an opposed pair of eccentric rollers 20—20. These rollers normally rest upon the rear portions of the side sills 5 of the main frame, and are eccentrically pivoted to the respective rear uprights 14, as at 21. The rollers 20 are concentrically connected by an angular shaft 22, and extending at right angles from this shaft is a lever 23 which is normally disposed in a substantially vertical plane. In the normal position of the parts as above described, the uprights 13 and 14 are disposed vertically, and as a result, the pivot 21 of the rollers 20 will be disposed in the same horizontal plane as the shaft 22. Upon forward movement of the lever 23, the eccentric rollers 20 will roll slightly forward along the side sills 5 of the main frame, and at the same time the upper portions of the uprights 13 and 14 will be inclined forwardly. As the rollers 20 are thus moved, the pivots 21 will be caused to move in an arc struck from the center of the shaft 22. As a result, the rear portion of the supplemental frame will be elevated to the position clearly shown in Fig. 2 of the drawings. In order to manually actuate the lever 23, a hand lever 24 is fulcrumed upon the transverse shaft 15 and a rod 25 has pivotal connection at its ends to the levers 23 and 24.

In order to lock the supplemental frame B in its elevated position, the rollers 20 are each formed in its periphery with a series of ratchet teeth 26, and these teeth are engaged by gravity pawls 27 which are respectively pivoted as at 28 to the upper longitudinal links 19 of the supplemental frame B. In order to simultaneously retract the pawls 27 so as to permit of the supplemental frame B returning to its normal position, there is provided a transverse shaft 29 which has its ends journaled in the upper links 19. Fixed upon the outer ends of this shaft are crank arms 30—30. Bell crank levers 31—31 are respectively fulcrumed at their angles upon the upper links 19 of the supplemental frame B. Links 32 are each pivotally connected at one end to one arm of a respective bell crank lever 31, and at its other end to a respective pawl 27. Links 33—33 are each pivotally connected at one end to a respective crank arm 30, and at its other end to the remaining arm of a respective bell crank lever 31. Fixedly secured to the transverse shaft 29 is a hand lever 34 which, when depressed in a forward direction, will cause the crank arms 30 to pull upon the links 33, the links 33 causing the bell crank levers 31 to be swung upon their fulcrums and to elevate the pawls 27 through the medium of the links 32, thereby releasing the eccentric rollers 20 and permitting the supplemental frame B to return to its normal position. The hand levers 24 and 34 are disposed at the forward portion of the implement, and are in close proximity to an operator's seat 35 which is supported upon a platform 36 carried by the forward end of the main frame A. The supplemental frame B is yieldably held in its normal position by means of a plurality of coil springs 37—37, each spring being connected at one end to the front end sill 6 of the main frame A, and at its other end to the lower portion of a respective front upright 13.

My invention further comprises a rotary plow element, which is designated as a whole by the reference letter C. This element includes a rectangular shaft 38 having rounded ends which are journaled in the lower links 18 of the supplemental frame B intermediate the drive gears 12 and the rear uprights 14. Fixed on the outer ends of this shaft are pinions 39—39 which normally engage with the drive gears 12 and serve to rotate the shaft 38 when the implement is traveling under normal conditions. Carried by the shaft 38 and disposed within the supplemental frame B is a plurality of plow sets 40—40 and 41—41, the sets being alternately arranged along the shaft. While I have shown four of these sets, it will of course be understood that more or less number of sets may be employed if desired.

Each set 41 includes an oppositely extending pair of standards 43—43 which are disposed on opposite sides of the shaft 38, and are arranged at right angles thereto. Each standard 43 is formed with oppositely extending lateral feet 44—44 for receiving the inner ends of an opposed pair of standards 45—45, the last mentioned standards being arranged at right angles to the standards 43. Bolts 46 or other suitable means are employed for connecting the feet 44 of the standard 43 and the standards 45 together. By means of these bolts, all of said standards are clamped to the axle 38, as will be readily understood. Carried by the outer ends of the standards 43 and 45 are plows 47 of any suitable type. Each set 41 includes opposite standards 48—48 and 49—49, the former having their inner ends angularly recessed, as at 50—50, for engagement with opposed angles of the axle 38. The standards 49 are provided with opposed lateral feet 51—51, and bolts 52 or other suitable fastening means are employed for securing the standards 48 and 49 to each other and to the axle 38. The standards 48 and 49 are respectively provided on their outer ends with plows 53 of any suitable type. It will thus be observed that the standards 48 and 49 of the sets 42 are respectively arranged intermediate the standards 43 and 45 of the sets 41. As a plows will work in the ground at the same time. In other words, where four sets of plows are shown and four plows on each set, the plows will be successively engaged by pairs in the ground, thus causing eight chopping actions to occur upon each complete revolution of the axle 38.

In operation, should a large stone or other obstruction be engaged by any pair of these plows, the obstruction will act as an abutment and cause the axle 38 to remain substantially still while the main frame A moves forward a short distance. As a result, the supplemental frame will be swung forwardly upon the shaft 15 as above described, the forward movement of the supplemental frame will cause the eccentric rollers 20 to be shifted, and as a result, the rear end of the supplemental frame B will be elevated to the position shown in Fig. 2 of the drawings. In this position, the pinions 39 will be disengaged from the drive gears 12 and the plows 47 will be elevated some distance. The plow element C will be automatically locked in its elevated position through the medium of the gravity pawls 27 operating on the ratchet teeth 26 of the eccentric rollers 20. After the obstruction has been passed, the operator can readily return the supplemental frame B and consequently the plow element C to their normal positions upon the manipulation of the hand lever 34 as above described. As soon as the pawls 27 are released by the lever 34, the springs 37 will assist in returning the supplemental frame and the plow element to their normal positions, as will be readily understood.

When it is desired to transport the implement, the hand lever 24 is actuated, and this lever will actuate the eccentric rollers 20 in the manner as above described, thereby elevating the frame B and plow element C, and at the same time automatically locking said parts in their inoperative positions.

What is claimed is:

1. In an agricultural implement, a wheeled main frame including driving means, a rotary plow element supported by the main frame and normally engaged with said driving means, means for automatically disengaging said element from the driving means when said element strikes an obstruction, and means for automatically locking said element in its inoperative position.

2. In an agricultural implement, a wheeled main frame including driving means, a rotary plow element supported by the main frame and normally engaged with said driving means, means for automatically disengaging said element from the driving means when said element strikes an obstruction and simultaneously elevating said element, and means for automatically locking said element in its inoperative position.

3. In an agricultural implement, a wheeled main frame including driving means, a rotary plow element supported by the main frame and normally engaged with said driving means, means for automatically disengaging said element from the driving means when said element strikes an obstruction, means for automatically locking said element in its inoperative position, and means for releasing said locking means.

4. In an agricultural implement, a wheeled main frame including driving means, a rotary plow element supported by the main frame and normally engaged with said driving means, means for automatically disengaging said element from the driving means when said element strikes an obstruction and simultaneously elevating said element, means for automatically locking said element in its inoperative position, and means for releasing said locking means.

5. In an agricultural implement, a wheeled main frame including a driving means, a rotary plow element supported by the main frame and normally engaged with said driving means, means for yieldably holding said element in engagement with the driving means, and means for automatically disengaging said element from the driving means against the tension of said yieldable means when said element strikes an obstruction.

6. In an agricultural implement, a wheeled main frame including a driving means, a rotary plow element supported by the main frame and normally engaged with said driving means, means for yieldably holding said element in engagement with the driving means, means for automatically disengaging said element from the driving means against the tension of said yieldable means when said element strikes an obstruction, and means for automatically locking said element in its inoperative position.

7. In an agricultural implement, a wheeled main frame including a driving means, a rotary plow element supported by the main frame and normally engaged with said driving means, means for yieldably holding said element in engagement with the driving means, means for automatically disengaging said element from the driving means against the tension of the yieldable means when said element strikes an obstruction and simultaneously elevating said element, and means for automatically locking said element in its inoperative position.

8. In an agricultural implement, a wheeled main frame including a driving means, a supplemental frame including a link fulcrumed intermediate its ends upon the main frame, a rotary plow element supported by the supplemental frame and normally engaged with said driving means, and means carried by the supplemental frame and engaging the main frame for automatically disengaging said element from the driving means when said element strikes an obstruction.

9. In an agricultural implement, a wheeled main frame including a driving means, a supplemental frame including a link fulcrumed intermediate its ends upon the main frame, a rotary plow element supported by the supplemental frame and normally engaged with said driving means, means carried by the supplemental frame and engaging the main frame for automatically disengaging said element from the driving means when said element strikes an obstruction, and means for automatically locking said element in its inoperative position.

10. In an agricultural implement, the combination with a main frame, of tractor wheels supporting said frame, a driving gear carried by one of said wheels, a supplemental frame fulcrumed upon the main frame for longitudinal swinging movements, a transversely disposed shaft carried by the supplemental frame, a plow fixed on said shaft to rotate therewith, a pinion carried by said shaft and adapted in one position of the supplemental frame to mesh with said drive gear, and means for automatically disengaging the pinion from the gear when the plow strikes an obstruction.

11. In an agricultural implement, the combination with a main frame, of tractor wheels supporting said frame, a driving gear carried by one of said wheels, a supplemental frame fulcrumed upon the main frame for longitudinal swinging movements, a transversely disposed shaft carried by the supplemental frame, a plow fixed on said shaft to rotate therewith, a pinion carried by said shaft and adapted in one position of the supplemental frame to mesh with said drive gear, means connecting said frames for yieldably holding the pinion in engagement with the gear, and means for automatically swinging the supplemental frame against the tension of the yieldable means for disengaging the pinion from the gear when the plow strikes an obstruction.

12. In an agricultural implement, the combination with a main frame, of tractor wheels supporting said frame, a driving gear carried by one of said wheels, a supplemental frame fulcrumed upon the main frame for longitudinal swinging movements, a transversely disposed shaft carried by the supplemental frame, a plow fixed on said shaft to rotate therewith, a pinion carried by said shaft and adapted in one position of the supplemental frame to mesh with said drive gear, means for automatically disengaging the pinion from the gear when the plow strikes an obstruction, and means for automatically locking said plow in its inoperative position.

13. In an agricultural implement, the combination with a main frame, of tractor wheels supporting said frame, a driving gear carried by one of said wheels, a supplemental frame fulcrumed upon the main frame for longitudinal swinging movements, a transversely disposed shaft carried by the supplemental frame, a plow fixed on said shaft to rotate therewith, a pinion carried by said shaft and adapted in one position of the supplemental frame to mesh with said drive gear, means connecting said frames for yieldably holding the pinion in engagement with the gear, means for automatically swinging the supplemental frame against the tension of the yieldable means for disengaging the pinion from the gear when the plow strikes an obstruction, means for automatically locking said element in its inoperative position, and means for releasing said locking means.

14. In an agricultural implement, the combination with a main frame, of tractor wheels supporting said frame, a driving gear carried by one of said wheels, a supplemental frame fulcrumed upon the main frame for longitudinal swinging movements, a transversely disposed shaft carried by the supplemental frame, a plurality of sets of plows fixed on the shaft to rotate therewith, the plows of alternate sets being respectively positioned intermediate the plows of the other sets, a pinion carried by said shaft and adapted in one position of the supplemental frame to mesh with said drive gear, and means for automatically disengaging the pinion from the gear when the plow strikes an obstruction.

15. In an agricultural implement, the combination with a main frame, of tractor wheels supporting said frame, a driving gear carried by one of said wheels, a supplemental frame including spaced front and rear uprights, the front uprights being each fulcrumed intermediate its ends upon the main frame, upper and lower links respectively connected to the upper and lower ends of the uprights, a transversely disposed shaft carried by the lower link, a plow fixed on said shaft to rotate therewith, a pinion carried by said shaft and adapted in one position of the supplemental frame to mesh with said driving gear, and means for automatically disengaging the pinion from the gear when the plow strikes an obstruction.

16. In an agricultural implement, the combination with a main frame, of tractor wheels supporting said frame, a driving gear carried by one of said wheels, a supplemental frame including spaced front and rear uprights, the front uprights being each fulcrumed intermediate its ends upon the main frame, upper and lower links respectively connected to the upper and lower ends of the uprights, a transversely disposed shaft carried by the lower link, a plow fixed on said shaft to rotate therewith, a pinion carried by said shaft and adapted in one position of the supplemental frame to mesh with said driving gear, a roller eccentrically pivoted to one of the rear uprights and bearing upon the main frame, and adapted when the plow strikes an obstruction to swing the supplemental frame to disengage the pinion from the driving gear, said roller being formed on its periphery with a plurality of ratchet teeth, and a gravity pawl carried by the adjacent upper link for engagement with the ratchet teeth of the roller to lock the supplemental frame in its inoperative position.

In testimony whereof, I affix my signature, in presence of two witnesses.

JOSEPH EDWIN LAMB.

Witnesses:
G. M. GIBSON,
A. A. FAIRLY.